United States Patent [19]

Schnick et al.

[11] Patent Number: 5,370,853

[45] Date of Patent: Dec. 6, 1994

[54] INORGANIC MICROPOROUS SOLIDS AND A PROCESS FOR THEIR PREPARATION

[75] Inventors: Wolfgang Schnick; Jan Lücke, both of Bonn, Germany

[73] Assignee: Bayer AG, Leverkusen, Germany

[21] Appl. No.: 2,727

[22] Filed: Jan. 11, 1993

[30] Foreign Application Priority Data

Jan. 21, 1992 [DE] Germany .................... 4201484

[51] Int. Cl.$^5$ ............................................ C01B 21/00
[52] U.S. Cl. .................................. 423/371; 423/279;
423/302; 423/326; 423/327.1; 502/200;
502/202; 502/208; 502/214
[58] Field of Search .................. 423/302, 306, 351;
502/208, 214, 200

[56] References Cited

U.S. PATENT DOCUMENTS

| | | | |
|---|---|---|---|
| 3,991,166 | 11/1976 | Jack et al. ........................... | 501/98 |
| 4,455,388 | 6/1984 | Robinson et al. ................... | 502/209 |
| 4,582,694 | 4/1986 | Young ................................. | 502/85 |
| 4,609,631 | 9/1986 | Messier et al. ..................... | 501/35 |

OTHER PUBLICATIONS

A. F. Wells, *Structure Inorganic Chemistry*, 5th ed., (1984), pp. 832–837; 161–167; 86–90.
*Chemical Abstracts*, vol. 91, No. 22, Nov. 1979, abstract No. 185842w, V. Kolsky et al., "Study of the mechanism of diaminotetrachlorocyclotriphosphazene synthesis", p. 717; & SB. Pedadog, Fak. Usti, Nad Laben., *Rada. Chem.*, 1979, pp. 101–109.
W. Schnick et al., "ZN7(P12N24)C12- A Sodalite with a Phosphorus–Nitrogen Framework", *Anfewandte Chemie International, Eng. Ed*, BD. 31, Nr. 2, Feb., 1992, pp. 213–215.
Joseph V. Smith, "Topochemistry of Zeolites and Related Materials. 1. Topology and Geometry", *Chem. Rev.* (1988) vol. 88, No. 1., pp. 149–182.
W. M. Meier and D. H. Olson, *Atlas of Zeolite Structure Types*–2nd ed., 1987.
Geoffrey A. Ozin, Alex Kuperman and Andreas Stein, "Advanced Zeolite Materials Science", *Angew. Chem.*, 101 (1989) Nr. 3., pp. 373–390.
Alfred Schmidpeter, "Tetraaminophosphonium Ions, Their Preparation and Use", 1st international Congress on Phosphorus Compounds Rabat, Oct. 17–21, 1977.
Vaughn J. Koester and T. M. Dunn, "Electronic Spectrum of the Tetrachloronickelate(II) complex at 2.2° K", *Inorganic Chemistry*, vol. 14, No. 8, (1975).
Alfred Schmidpeter, Caspar Weingand and Elke Hafner-Roll, "Zur Ammonolyse von Chlorphosphoranen", *Z. Naturforschung*, 24 b, 799–810, (1969).

*Primary Examiner*—Anthony McFarlane
*Attorney, Agent, or Firm*—Connolly and Hutz

[57] ABSTRACT

This invention relates to inorganic microporous solids having a framework structure of $AX_4$-tetrahedrons linked by their corners, wherein A denotes at least one electropositive element selected from the group consisting of Be, B, Al, Ga, C, Si, Ge, P, As and S, and at least 10 of the X atoms are nitrogen. The invention also relates to a process for the preparation of these solids.

16 Claims, No Drawings

INORGANIC MICROPOROUS SOLIDS AND A PROCESS FOR THEIR PREPARATION

BACKGROUND OF THE INVENTION

The present invention relates to new inorganic microporous solids having a framework structure consisting of $AX_4$-tetrahedrons linked by their edges and to a process for the preparation of these solids.

Crystalline aluminosilicates of the zeolite type have long been known and well defined (J. V. Smith; Chem. Rev. 88 (1988) 149). More than 64 structural types with well over 1000 variations, both of natural and of synthetic origin, are known under the term of "Molecular sieves" (W. M. Meier, D. H. Olsen: "Atlas of Zeolite Structure Types"; Second Edition, Butterworth, London (1987)). The common structural element of these oxo compounds consists of three-dimensional $AO_4$ tetrahedrons (A=Si, Al) linked at all the corners (oxygen atoms). Their characteristic feature is that they have pores of a specified, variable size which imparts ion exchange and reversible adsorption properties to these compounds without bringing about changes in the structure forming network. These micro-porous solids have found many different uses (F.Schwochow, L. Puppe; Angew. Chem. 87 (1975) 659).

They are used for the adsorption of gases (purification of gas mixtures) and liquids (molecular sieve) (B. E. Ullmann, E. Biekert "Ullmanns Encyclopädie der Technischen Chemie", Volume 17, 4th Edition, published by Verlag Chemie, Weinheim (1972) page 9). They also serve as catalysts for various reactions (hydrogenation/dehydrogenation, cracking of crude petroleum hydrocarbons, isomerisation of alkanes) and for the separation of mixtures (Chromatography, Ion exchangers) (W. Höderich, M. Hesse, F. Näumann; Angew. Chem. 100 (1988) 232). New applications, some of which are still in the state of development, are based on their property of ionic conductors (solid electrolytes) and as carrier material for enzymes and microorganisms (Biotechnologie) (G. A. Ozin, A. Kuperman, A. Stein; Angew. Chem. 101 (1989) 373).

Common to all the compounds described is that oxygen forms the electronegative part of the structural framework. In numerous compounds which have been synthesized, silicon or aluminium has been partly or completely replaced by other electropositive elements (B, P, Fe, Cr, Sb, As, Ga, Ge, Ti, Zr, Hf) (J. V. Smith; Chem. Rev. 88 (1988) 149). This has enabled compounds with modified properties to be obtained (W. Höderich, M. Hesse, F. Näumann; Angew. Chem. 100 (1988) 232).

The systems described do not always fulfil the desired requirements, in particular as regards their strength and chemical resistance.

SUMMARY OF THE INVENTION

It is an object of the present invention to provide compounds which do not have these disadvantages. It has now been found that these requirements are fulfilled by microporous structures which are built up from $AN_4$-tetrahedrons linked at their corners (A=central atom surrounded by tetrahedron).

This invention thus relates to inorganic microporous solids having a structure of $AX_4$-tetrahedrons linked by their corners, in which A denotes one or more electropositive elements selected from Be, B, Al, Ga, C, Si, Ge, P, As and S and at least 10% of the X atoms are nitrogen.

X preferably consists entirely of nitrogen. These nitrogen-containing, zeolite-like compounds according to the invention have a great potential for advantageous applications.

Thus nitrogen, in contrast to oxygen, is able to form three bonds with adjacent atoms; further, nitrogen has a lower electronegativity than oxygen. Replacement of oxygen by nitrogen in zeolites could bring about an important modification in the basicity of these compounds, in particular for catalytic purposes, so that the formation of framework structures of $AN_4$-tetrahedrons leads to a greater structural flexibility and enables new microporous solids having modified or even completely new properties to be synthesized. Variation of the pore size provides a new means of altering the adsorption of gases and liquids. Both properties are at present of great scientific and economical interest.

DETAILED DESCRIPTION OF THE INVENTION

In a preferred embodiment of this invention at least 10 At.-% of A consists of phosphorus and the remainder required to make up the 100 At.-% consists of silicon and/or aluminium. A most preferably consists entirely of phosphorus.

Particularly good results are obtained with inorganic solids having the general composition $M_xH_y[A_{12}N_{24}]Z_z$ in which $x=0-8$,
$y=0$ to 14,
$z=0$ to 2,
M=metal cations with 1-, 2-, 3- or 4-charges,
Z=anions with 1-, 2-, 3- or 4-charges and
A=at least 10 atoms-% of phosphorus and the remainder required to make up the 100 atoms-% consists of aluminium and/or silicon, the overall composition having electroneutrality.

In particular,

M=one or more metals selected from Mg, Ca, Sr, Ba, Cr, Mn, Fe, Co, Ni, Zn, Cu, Yb, Eu, Pr and Nd,
Z=Cl and/or Br and
A=P.

The three-dimensional network structure of the $AX_4$-tetrahedrons is preferably that of a zeolite structural type and the pore size of the microporous solids is from 0.2 to 5 nm.

This invention also relates to compounds in which M and/or H is/are completely or partially replaced by another metal M' so that the following empirical overall formula is obtained: $M_xM'_rH_y[A_{12}N_{24}]Z_z$, where M' is a metal and r has a value from 0 to 8. If additional metals M' are to be incorporated, the following conditions must be fulfilled: The solid obtained after the exchange must be electrically neutral, i.e. there must be an equality of charges. Further, the metal M' must have a suitable ionic radius to replace the metal M originally present. This means, on the basis of the size of the cationic space dictated by the structure, that the ionic radius should not differ by more than ±20%. Moreover, a suitable redox stable starting compound should be available for the preparation of this solid.

The compounds according to the invention are nitridic solids having a three-dimensional structural framework (isostere to the oxo-zeolites) and a specified pore size. They manifest characteristic adsorption properties and ion exchange reactions. Owing to their high stability to heat and chemical influences, the compounds according to the invention are suitable for use as catalysts and as catalyst auxiliaries. Owing to their intense colour, they are also suitable as pigments, e.g. for colouring synthetic resins, in which case M and M' would be transition metals such as Cr, Mn, Fe, Co, Ni, Cu, Pr, Eu, Yb or Nd. The compounds may also be used as flame-retardants and as solid electrolytes.

Preparation of the compounds according to the invention may be carried out by various methods.

The invention also relates to a process for the preparation of an inorganic solid having the general composition $M_xH_y[A_{12}N_{24}]Z_z$ in which x=0–8,
y=0–14,
z=0–2,
M=metal cations with 1-, 2-, 3- or 4-charges,
Z=anions with 1-, 2-, 3- or 4-charges and
A=at least 10 atoms-% of phosphorus, the remainder required to make up the 100 atoms-% being aluminium and/or silicon, the whole composition being electrically neutral, characterised in that a compound containing or forming A—N and optionally containing Z, in which the ratio of A to N is from 1:1 to 1:2, is reacted with a metal halide compound $MZ_n$ in which n denotes the valency of the metal M, the reaction being carried out in the presence of $NH_3$ and/or $NH_4Z$ for reducing the ratio of A to N to 1:2 if it is greater than this ratio.

The following have so far been preferred:
M=one or more metals selected from Mg, Ca, Sr, Ba, Cr, Mn, Fe, Co, Ni, Zn, Ca, Yb, Eu, Pr and Nd,
Z=Cl and/or Br and
A=phosphorus.

The compounds containing phosphorus and nitrogen may either be used directly or formed in situ in the reaction mixture.

The compounds used for supplying nitrogen are preferably ammonium chloride or ammonia. These may be used in their pure form or chemically bound (e.g. in the form of metal amine complexes, amides or nitrides).

The A—N-containing or A—N-forming substance used is preferably P, $PZ_5$, $PNZ_2$, $P_3N_5$ and/or $HPN_2$. Suitable starting compounds containing phosphorus are in particular all compounds formed in the ammonolysis of $PCl_5$ and their condensation products (see A. Schmidtpeter, C. Weingand, E. Hafner-Roll; Z. Naturforsch, 24 b (1969) 799). Replacement of Cl by $NH_2$ in phosphorus(V) chloride followed by condensation reactions leads to numerous conceivable compounds, for example $PCl_5 + 4\ NH_3 \rightarrow P(NH_2)_4Cl + 4\ HCl$ (substitution)

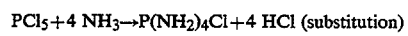
(condensation)

For a practical application of these compounds as starting substances (phosphorus component) for the synthesis of the microporous solids according to the invention, compounds which can be obtained in a pure and definite form from ammonolysis followed by the condensation of $PCl_5$ are particularly suitable for ensuring particular stoichiometric ratios, but any other ammonolysis products of $PCl_5$ may in principle also be used successfully. $HPN_2$ and/or $PNCl_2$ are particularly preferred. Heterogeneous ammonolysis of $P_3N_5$ with gaseous ammonia has been developed as a particularly suitable method of preparation for the microporous solids according to the invention. In this process, the required $NH_3$ is obtained by the reaction of a metal nitride (e.g. $Zn_3N_2$) with $NH_4Cl$ in accordance with the following equation:

e.g. $Zn_3N_2 + 6\ NH_4Cl \rightarrow 3\ ZnCl_2 + 8\ NH_3$.

The microporous solid according to the invention is then obtained if the metal halide formed reacts either as a volatile component via the gaseous phase or by direct mixing with the $P_3N_5$ used for the synthesis.

$4\ P_3N_5 + 4\ NH_3 + 7\ ZnCl_2 \rightarrow Zn_7[P_{12}N_{24}]Cl_2 + 12\ HCl$.

Any other nitrides or chlorides or bromides of other metals may be used instead of the zinc nitride or zinc chloride exemplified here. Preparation of the microporous solids according to the invention may also be carried out analogously with the polymerized phosphorus component phosphorus(V) nitride-imide ($HPN_2$) in accordance with the following reaction scheme:

$7\ MZ_2 + 12\ HPN_2 \rightarrow M_7[P_{12}N_{24}]Z_2 + 12\ HZ$.

M=Mg, Ca, Sr, Ba, Cr, Mn, Fe, Co, Ni, Cu, Zn, Yb, Nd, Eu, Pr;
Z=Cl, Br.

The microporous solids according to the invention may also be synthesized from molecular phosphorus components, of which hexachloro-cyclotriphosphazene $(PNCl_2)_3$ has proved particularly useful. For this purpose, $(PNCl_2)_3$ is reacted with the metal halide and $NH_3$ or $NH_4Cl$ in accordance with the following equation:

$7\ MZ_2 + 4\ (PNZ_2)_3 + 12\ NH_3 \rightarrow M_7[P_{12}N_{24}]Z_2 + 36\ HZ$.

M=Mg, Ca, Sr, Ba, Cr, Mn, Fe, Co, Ni, Cu, Zn, Yb, Nd, Eu, Pr;
Z=Cl, Br.

The solids prepared by this method may still contain hydrogen if the metal halide was present in a subequivalent amount (e.g. according to a composition $M_{7-x}H_{2x}[P_{12}N_{24}]Cl_2$). When these hydrogen-containing products are reacted with excess metal halide, H is progressively replaced by M in accordance with, for example, the following equation:

$M_{7-x}H_{2x}[P_{12}N_{24}]Cl_2 + X.MCl_2 \rightarrow M_7[P_{12}N_{24}]Cl_2 + 2x\ HCl$.

The reactions shown above are carried out at temperatures from room temperature to 850° C. Temperatures in the region of from 400° to 850° C. are particularly suitable for the solid phase or gas phase reactions specifically described here.

The reactions of phosphorus components with metal halides and ammonia or $NH_4Cl$ to form the microporous solids according to the invention may also be carried out in solution with suitable solvents (e.g. $CCl_4$, $Cl_2HCCHCl_2$, THF, diglymes, liquid $NH_3$). These reactions are preferably carried out in closed reaction apparatus at temperatures in the range of from 25° to 600° C., optionally using templates (e.g. ternary amines, quaternary ammonium salts).

The microporous solids according to the invention are in most cases obtained as a pure phase. Any impurities present due to excess metal halide or NH$_4$Cl may be removed by sublimation in a vacuum.

To prevent the formation of oxo compounds, all the operations (preparation, handling and identification of the educts and products) are preferably carried out with strict exclusion of oxygen and water.

The novel microporous solids described in this invention are synthesized as microcrystalline solids which are insoluble in all conventional solvents, acids and bases under normal conditions.

The invention will now be illustrated with the aid of Examples which should not be regarded as limiting.

EXAMPLE 1

2 mmol of P$_3$N$_5$ (326 mg) are introduced into a cylindrical quartz glass ampoule together with a mixture of 0.25 mmol of Zn$_3$N$_2$ (56 mg) and 1.5 mmol of NH$_4$Cl (80 mg). The ampoule is evacuated and sealed by melting to make it gas-tight. The ampoule is placed in a tubular oven and heated to 600° C. for 7 days. A colourless, microcrystalline powder is obtained. The following composition is obtained for the solid by wet chemical and EDX analysis: Zn$_{4.3}$H$_{5.4}$P$_{12}$N$_{24}$Cl$_2$. Three absorption bands (3110, 1080 and 560 cm$^{-1}$) appear in the infra-red spectrum. In the powder X-ray diffraction diagram (CuK$_{\alpha 1}$ irradiation) the strongest reflexes are observed at the following 2$\Theta$-values (relative intensity in percent): 15.21 (15%), 26.49 (100%), 34.47 (14%), 37.98 (19%), 41.04 (26%) and 46.94 (24%).

EXAMPLE 2

1.4 mmol of Nickel(II) chloride (NiCl$_2$) (181.4 mg), 0.4 mmol of hexachlorocyclotriphosphazene (PNCl$_2$)$_3$ (139.1 mg) and 1.2 mmol of ammonium chloride NH$_4$Cl (64.2 mg) are homogenized and introduced into an ampoule and transferred to a tubular oven as in Example 1. The reaction temperature is initially 500° C. (1 day), and then 750° C. (3 days). The product is deep blue in colour and has absorption maxima at 229, 600 and 1050 mm in the UV-VIS spectrum. Analysis shows the following composition: Ni$_{4.0}$H$_6$P$_{12}$N$_{24}$Cl$_2$. Two bands appear in the infra-red spectrum (1075 and 565 cm$^{-1}$). In the powder X-ray diffraction diagram (CuK$_{\alpha 1}$-irradiation) the strongest reflexes are obtained at the following 2$\Theta$-values (relative intensity in percent): 15.29 (20%), 26.67 (100%), 34.66 (15%), 38.08 (25%), 41.27 (29%) and 47.13 (20%).

EXAMPLE 3

2.4 mmol of phosphorus nitride-imide HPN$_2$ (144.0 mg) and 1.4 mmol of zinc(II) bromide ZnBr$_2$ (315.3 mg) are homogenized and introduced into an ampoule and transferred to a tubular oven as in Example 1. The reaction temperature is 470° C. (2 days) and 800° C. (2.5 days). A colourless, microcrystalline product having the composition Zn$_{3.7}$H$_{6.6}$P$_{12}$N$_{24}$Br$_2$ is obtained. Three bands occur in the infra-red spectrum at 3155, 1084 and 565 cm$^{-1}$. In the powder X-ray diffraction diagram (CuK$_{60\,1}$ irradiation) the strongest reflexes are obtained at the following 2$\Theta$-values: 21.51 (6%), 26.51 (100%), 30.74 (5%), 37.91 (9%) and 41.05 (35%).

EXAMPLE 4

0.14 mmol of Zn$_4$H$_6$[P$_{12}$N$_{24}$]Cl$_2$ (100 mg) and 0.6 mmol of zinc chloride ZnCl$_2$ (81.8 mg) are introduced into an ampoule and transferred to a tubular oven as in Example 1 and heated to 700° C. (6 days) in an argon atmosphere (1 bar). A hydrogen-free product is formed with liberation of hydrogen chloride; excess zinc chloride is removed by sublimation in a high vacuum. A colourless, microcrystalline product having the composition Zn$_7$[P$_{12}$N$_{24}$]Cl$_2$ is obtained. Two absorption bands appear in the infra-red spectrum at 1080 and 570 cm$^{-1}$. In the X-ray diffraction diagram (CuK$_{\alpha 1}$ irradiation) the strongest reflexes are obtained at the following 2$\Theta$-values: 15.19 (7%), 26.47 (100%), 34.38 (15%), 37.78 (19%), 40.94 (32%) and 46.72 (47%).

EXAMPLE 5

6 mmol of Phosphorus nitride-imide HPN$_2$ (360 mg) and 3.5 mmol of zinc(II) chloride ZnCl$_2$ (477 mg) are homogenised and transferred to a corundum vessel and placed in a reaction tube of quartz glass. The mixture is heated in a tubular oven, first for 3 days at 700° C. in an ammonia atmosphere (1 bar), then for 3 days at 800° C. in a nitrogen atmosphere (1 bar). A colourless, microcrystalline product having the composition Zn$_6$[P$_{12}$N$_{24}$] is obtained. Two bands appear in the infra-red spectrum at 1070 and 520 cm$^{-1}$. The strongest reflex in the X-ray diffraction diagram is at 2$\Theta$=26.4 (100%).

EXAMPLE 6

0.5 mmol of Hexammine cobalt(II) chloride Co(NH$_3$)$_6$Cl$_2$ (116 mg) and 1 mmol of hexachlorocyclotriphosphazene (PNCl$_2$)$_3$ (116 mg) are introduced into an ampoule and transferred to a tubular oven as in Example 1. The reaction time is 2.5 days (500° C.). A deep blue, microcrystalline powder having absorption bands in the infra-red spectrum at 1091 and 496 cm$^{-1}$ is obtained. Analysis shows a composition of Co$_2$H$_{10}$[P$_{12}$N$_{24}$]Cl$_2$. In the powder X-ray diffraction diagram the strongest reflex is at 2$\Theta$=26.5 (100%).

The following starting compounds were used in the Examples:

a) Phosphorus Components

Phosphorus pentachloride PCl$_5$ (Riedel-de-Haen Company, Seelze) and hexachlorocyclotriphosphazene (PNCl$_2$)$_3$ (Merck-Schuchardt Company, Hohenbrunn) are suitable commercially obtainable educts. They are particularly suitable for synthesis in closed reaction vessels due to their volatility. Less volatile phosphorus-nitrogen components are necessary for synthesis in open reaction vessels. Hexamine cyclotriphosphazene (PN(NH$_2$)$_2$)$_3$, phosphorus nitride-imide HPN$_2$ and phosphorus nitride P$_3$N$_5$ are suitable for this purpose. These compounds are obtainable from the above-mentioned compounds by reaction with ammonia.

b) Nitrogen components

Ammonia gas which has been purified from traces of water by passing it over potassium hydroxide and condensing it on sodium/potassium is suitable as synthesis gas for use in open reaction vessels. Ammonium chloride NH$_4$Cl is sublimated in a high vacuum before use. For the production of ammonia in closed reaction vessels it is suitable to use mixtures of metal nitrides (metal=Li, Mg, Zn) and ammonium halide (halide=Cl, Br, I) which form metal halide and ammonia when heated in a space separated from the reaction space, e.g.

$$Mg_3N_2 + 6\ NH_4Cl \rightarrow 3\ MgCl_2 + 8\ NH_3.$$

c) The metals M and M' used (Mg, Ca, Sr, Ba, Cr, Mn, Fe, Co, Ni, Cu, Zn, Yb, Pr, Nd, Eu) are put into the process in the form of their anhydrous halides, amides and nitrides.

The preparation is carried out under the following conditions:

The nature and molar composition of the products is determined by various factors. The composition of the educts plays an important role for this purpose. Nitrogen and anion B are both used in excess and the ratio of metal to phosphorus is from 4:12 to 14:12. The solid starting components are homogenized and introduced into the reaction vessels. Nitrogen, argon and ammonia which are free from water and oxygen are used as reaction gases. The compounds may be synthesized both in closed and in open reaction vessels.

For the preparation in closed vessels, the educts are transferred into vessels of quartz glass. These vessels are cylindrical in form (height: 20 cm, diameter: 1.5 cm) with a reaction volume of 20 cm$^3$. When the educts have been introduced, the reaction space is evacuated and closed gas-tightly by melting (H$_2$/O$_2$ burner).

For synthesis in open vessels the educts are introduced into corundum vessels (height: 1.2 cm, width: 2.4 cm, length: 9.0 cm) and the vessels are introduced into cylindrical reaction tubes (diameter: 3.0 cm) of quartz glass. Connections to various reaction gases (ammonia, nitrogen, argon) are situated at the ends of the reaction tubes.

The previously prepared educts are reacted at temperatures of from 100° to 800° C., as described above. Reaction times of from 12 to 300 hours are required for obtaining homogeneous products.

The products are identified by various means. Initially, the composition was determined both by wet chemical methods (solution of the products in dilute sulphuric acid, complexometric identification of the metals, photometric identification of phosphorus and nitrogen and argentometric identification of halogen) and with the aid of energy dispersive X-ray microanalysis (EDX). A phosphorus:nitrogen ratio of 12:24 is obtained in all cases. The number of anions Z is from 0 to 2 and that of the cations M and M' from 0 to 8. The synthesized compounds were also investigated by infrared spectroscopy (KBr moulding, FT-IR spectrometer Model IFS113v, Bruker, Karlsruhe; adsorption was measured as a function of the wave number). An absorption band in the range of from 1050 to 1150 cm$^{-1}$ is characteristic of the compounds described here (asymmetric PN$_4$ tetrahedron vibration, typical of three-dimensionally linked tetrahedrons with zeolite-like structure). In addition to this most intensive band, another band appears at 500 to 600 cm$^{-1}$ which is interpreted as a lattice vibration. In addition, a band appears at 3050–3150 cm$^{-1}$ in the case of compounds containing hydrogen (nitrogen-hydrogen valency vibration).

The structural type of the compounds could be determined by the diffraction of X-rays (CuK$\alpha$1 irradiation, automatic powder diffractometer, STOE Company, Darmstadt) and the positions of the atoms constituting the elementary cell could be refined by the Rietveld Method. Thus, for example, the following values were typically found for the phosphorus-nitrogen compounds of the Sodalite type described here:

($\Theta$=Bragg angle, d=distance between network planes in Å, I=intensity of the measured reflex, I$_o$=intensity of the strongest measured reflex):

| 2 $\Theta$ | d | 100* I/I$_o$ |
| --- | --- | --- |
| 15.1–15.3 | 5.86–5.78 | 5–20 |
| 26.4–26.6 | 3.37–3.35 | 100 |
| 34.3–34.5 | 2.61–2.60 | 10–20 |
| 37.6–38.0 | 2.38–2.36 | 15–25 |
| 40.8–41.2 | 2.21–2.18 | 25–35 |
| 46.6–47.1 | 1.95–1.92 | 20–50 |

Thermal investigations (Argon-Atmosphere, Differential-Thermoanalysis STA 429, Netzsch Company, Selb) showed no changes in the products up to 800° C. Decomposition to phosphides sets in above this temperature. The coloured compounds (M and M'=Cr, Mn, Fe, Co, Ni, Cu, Yb, Pr, Nd, Eu) were investigated by UV-VIS-spectroscopy (UV-VIS-NIR-spectrophotometer CARY 2400, Varian Company, Darmstadt; the absorption was plotted against the wavelength, molar fraction 0.01 in barium sulphate). The three triplet transmissions to be expected for metal cations in a tetrahedral surrounding (V. J. Koester, T. M. Dunn; Inorg. Chem. 4 (1975) 1811) were observed.

What is claimed is:

1. Inorganic microporous solids having a three-dimensional framework structure which corresponds to a zeolite structure, said structure consisting of AX$_4$-tetrahedrons linked by their corners, wherein the solids consist of at least three different elements and A is one or more electropositive elements selected from the group consisting of Be, B, Al, Ga, C, Si, Ge, P, As and S, and at least 10% of the X atoms are nitrogen, wherein the microporous solids have a pore size of from 0.2 to 5 nm.

2. Inorganic solid according to claim 1, wherein X consists entirely of nitrogen.

3. Inorganic solid according to claim 1, wherein at least 10 atoms-% of A consists of phosphorus and the remainder required to make up the 100 atoms-% consists of at least one of silicon and aluminum.

4. Inorganic solid according to claim 2, wherein at least 10 atoms-% of A consists of phosphorus and the remainder required to make up the 100 atoms-% consists of at least one of silicon and aluminum.

5. Inorganic solid according to claim 1, wherein A consists entirely of phosphorus.

6. Inorganic solid according to claim 3, wherein A consists entirely of phosphorus.

7. Inorganic solid according to claim 1, wherein said solid has a general composition M$_x$H$_y$[A$_{12}$N$_{24}$]Z$_z$, wherein
x=0 to 8,
Y=0 to 14,
z=0 to 2
M=metal cations carrying 1-, 2-, 3- or 4- charges,
Z=anions carrying 1-, 2-, 3- or 4-charges and
A contains at least 10 atoms-% of phosphorus, and the remainder required to make up the 100 atoms-% consists of at least one of aluminium and silicon, and the overall composition demonstrates electroneutrality.

8. Inorganic solid according to claim 7, wherein
M=at least one metal selected from the group consisting of Mg, Ca, Sr, Ba, Cr, Mn, Fe, Co, Ni, Zn, Cu, Yb, Pr, Eu and Nd,
Z=at least one of Cl and Br, and
A=P.

9. A process for the preparation of an inorganic solid having the general formula $M_xH_y[A_{12}N_{24}]Z_z$ wherein
x=0–8,
y=0 to 14,
z=0 to 2,
M=metal cations carrying 1-, 2-, 3- or 4- charges,
Z=anions carrying 1-, 2-, 3- or 4- charges and
Z=at least 10 atoms-% of phosphorus, and the remainder required to make up the 100 atoms-% consists of at least one of aluminium and silicon, and the solid demonstrates electroneutrality, said process comprising reacting a substance containing or forming A—N and optionally containing Z, in which the ratio of A to N is from 1:1 to 1:2, with a metal halide compound $MZ_n$ wherein n is the valency of the metal M, the reaction being carried out in the presence of at least one of $NH_3$ and $NH_4Z$ so as to reduce the ratio of A to N to 1:2 if it is greater than this ratio.

10. A process according to claim 9, wherein
M=at least one metal selected from the group consisting of Mg, Ca Sr, Ba, Cr, Mn, Fe, Co, Ni, Zn, Cu, Yb, Eu, Pr and Nd,
Z=at least one of Cl and Br, and
A=phosphorus.

11. A process according to claim 9, wherein the substance containing or forming A-N consists essentially of at least one substance selected from the group consisting of P, $PZ_5$, $PNZ_2$, $P_3N_5$ and $HPN_2$.

12. A process according to claim 9, wherein the reaction is carried out in the absence of oxygen and water.

13. Inorganic microporous solids having a three-dimensional framework structure which corresponds to a zeolite structure, said structure consisting of $AX_4$-tetrahedrons linked by their corners, wherein the solid has the general composition $M_xH_y[A_{12}N_{24}]Z_z$, wherein
x=0 to 8,
y=0 to 14,
z=0 to 2,
M=metal cations carrying 1-, 2-, 3- or 4-charges,
Z=anions carrying 1-, 2-, 3- or 4-charges, and
A contains at least 10 atoms-% of phosphorus, and the remainder required to make up the 100 atoms-% consists of at least one of aluminum and silicon, and the overall composition demonstrates electroneutrality.

14. Inorganic microporous solids according to claim 13, wherein,
M=at least one metal selected from the group consisting of Mg, Ca, Sr, Ba, Cr, Mn, Fe, Co, Ni, Zn, Cu, Yb, Eu, Pr and Nd,
Z=at least one of Cl and Br, and
A=phosphorus.

15. Inorganic microporous solids according to claim 13, wherein,
M=at least one metal selected from the group consisting of Co, Ni and Zn,
Z=at least one of Cl and Br, and
A=phosphorus.

16. Inorganic microporous solids according to claim 13, wherein said solid has one of the following general compositions: $Zn_{4.3}H_{5.4}P_{12}N_{24}Cl_2$; $Ni_{4.0}H_6P_{12}N_{24}Cl_2$; $Zn_{3.7}H_{6.6}P_{12}N_{24}Br_2$; $Zn_7P_{12}N_{24}Cl_2$; $Zn_6P_{12}N_{24}$; and $Co_2H_{10}P_{12}N_{24}Cl_2$.

* * * * *